(12) United States Patent
Oddsen, Jr.

(10) Patent No.: US 7,096,560 B2
(45) Date of Patent: Aug. 29, 2006

(54) METHOD OF MAKING A CONFIGURABLE MOUNT

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 129 days.

(21) Appl. No.: 09/916,934

(22) Filed: Jul. 27, 2001

(65) Prior Publication Data

US 2002/0030148 A1 Mar. 14, 2002

Related U.S. Application Data

(62) Division of application No. 09/406,531, filed on Sep. 27, 1999.
(60) Provisional application No. 60/106,729, filed on Nov. 2, 1998, and provisional application No. 60/108,469, filed on Nov. 14, 1998.

(51) Int. Cl.
*B23P 11/00* (2006.01)
*F16M 13/00* (2006.01)

(52) U.S. Cl. .................... 29/525.11; 248/558
(58) Field of Classification Search .......... 29/525.11, 29/455.1, 469, 525.01, 281.1, 281.6; 248/558, 248/674, 122.1, 126, 127, 405, 411, 226.11
See application file for complete search history.

(56) References Cited

U.S. PATENT DOCUMENTS

| | | | |
|---|---|---|---|
| 632,999 A | 9/1899 | Grant | 248/314 |
| 931,437 A | 8/1909 | Larson | 248/314 |
| 1,764,071 A | 6/1930 | Foulke | 248/231.7 |
| 1,785,518 A | 12/1930 | Higgins | 248/314 |
| 2,148,307 A | 9/1939 | Scott | |
| 2,423,933 A | 7/1947 | Gosh | |
| 2,628,051 A | 2/1953 | Anderson | 248/231.7 |
| 2,756,954 A | 7/1956 | Whitlow | 248/314 |
| 2,950,836 A | 8/1960 | Murdock | |
| 2,961,209 A | 11/1960 | Willey | 248/231.7 |
| 3,131,900 A | 5/1964 | Anderson et al. | 248/210 |
| 3,145,005 A | 8/1964 | Wester | |
| 3,424,419 A | 1/1969 | Siegel | 248/226 |
| 3,489,383 A | 1/1970 | Anson | 248/226 |
| 3,568,963 A | 3/1971 | Koskinen | |
| 3,591,118 A | 7/1971 | Gentile | 248/226 |
| 3,628,759 A * | 12/1971 | Knedlik | 248/42 |
| 3,929,309 A | 12/1975 | De Vore | |
| 4,198,775 A * | 4/1980 | Leisner | 43/21.2 |
| 4,366,640 A | 1/1983 | Clapp | |
| 4,531,643 A | 7/1985 | Bradley | |
| 4,687,167 A | 8/1987 | Skalka et al. | 248/282 |
| 4,703,909 A | 11/1987 | Dayton et al. | 248/280.1 |
| 5,020,765 A | 6/1991 | Evans et al. | |
| 5,201,896 A | 4/1993 | Kruszewski | 248/278 |
| 5,277,392 A | 1/1994 | Rossman et al. | 248/231.7 |

(Continued)

OTHER PUBLICATIONS

Office Action dated Jun. 6, 2003 relating to Application No. 09/406,531.

*Primary Examiner*—John C. Hong
(74) *Attorney, Agent, or Firm*—Lerner, David, Littenberg, Krumholz & Mentlik, LLP

(57) ABSTRACT

A method of assembling a bracket from a plurality of components adapted for mounting a device for a supporting surface. A plurality of components are provided which can be assembled into a plurality of brackets each of a different configuration. At least one of the components includes a shaft holder having an opening formed therein adapted to movably support the device. At least one of the brackets can be assembled from less than all of the components. The brackets are formed by assembling a plurality of the components including at least the shaft holder.

27 Claims, 18 Drawing Sheets

U.S. PATENT DOCUMENTS

| | | | |
|---|---|---|---|
| 5,277,432 A | * 1/1994 | Bateman | 273/407 |
| 5,370,570 A | 12/1994 | Harris | |
| 5,615,854 A | 4/1997 | Nomura et al. | 248/287.1 |
| 5,642,819 A | 7/1997 | Ronia | 211/86.01 |
| 5,664,750 A | 9/1997 | Cohen | 248/231.71 |
| 5,690,604 A | 11/1997 | Barnett | |
| 5,706,832 A | 1/1998 | Gold | |
| 5,765,794 A | 6/1998 | Chen | 248/292.12 |
| 5,903,991 A | * 5/1999 | Sasse | 40/607 |
| 5,941,493 A | 8/1999 | Cheng | 248/371 |

* cited by examiner

METHOD OF MAKING A CONFIGURABLE MOUNT

CROSS REFERENCE TO RELATED APPLICATIONS

This application is a divisional of application Ser. No. 09/406,531 filed on Sep. 27, 1999 which application claims the benefit of U.S. Provisional Application No. 60/106,729 filed Nov. 2, 1998 and U.S. Provisional Application No. 60/108,469 filed Nov. 14, 1998, the disclosures of which are incorporated herein by reference.

BACKGROUND OF THE INVENTION

The present invention relates to apparatuses and systems for mounting an adjustable arm for a peripheral device such as a computer display screen, a keyboard, a telephone or the like.

SUMMARY OF THE INVENTION

Apparatuses and configurable mounting systems for mounting an arm device are disclosed. The arm device may be attached to a peripheral device, which may be an electronic device such as a computer display screen, a keyboard, a telephone or the like.

The systems comprise a set of components which may be configured to create apparatuses including a clamp mount, a wall mount, a "reverse" wall mount, or table or "flat" mount. In addition, the systems may comprise components which may be configured to create a panel mount and a slat wall mount. The mounting systems have many benefits and advantages to the consumer, distributor and manufacturer. The consumer obtains more than one different mounting option for the price of a single mount. Previously, the consumer was required to choose the type of mount which she desired at the time of purchase of the arm. The systems also provide flexibility of providing a different mounting configuration in the future, if the consumer decides to move the arm or reconfigure the mount. A distributor of the mounting systems benefits by being relieved from maintaining an inventory of each of the different types of mounts. Also, the mounting systems may be efficiently packaged since the component elements are preferably no wider than the width of a typical arm apparatus. There are several advantages to the manufacturer including a decrease in inventory costs similar to that of the distributor, a lowering of the "piece" price of the mount since components of the systems may be used in a number of configurations and distinct castings are not required for each type of mount, and a decrease in labor costs since the consumer completes final assembly in the configuration she desires.

The components of the mounting systems include a shaft holder for receiving the shaft of the arm device, a long "L" member, and short "L" member, a clamping plate, and clamping screw. In a preferred embodiment, these components are used in conjunction with standard hardware including a long bolt with a hex head, a short screw, a pair of screws having flat tapered countersunk heads, a pair of wall screws, and a single nut. With these components and hardware, at least four of the above-noted mounting configurations may be achieved by the mounting systems of the present invention.

In another aspect, the configurable mount invention additionally comprises adapter brackets that are used to secure the mount to conventional office panel systems and both single and dual slot wall systems.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION

Figure 1:
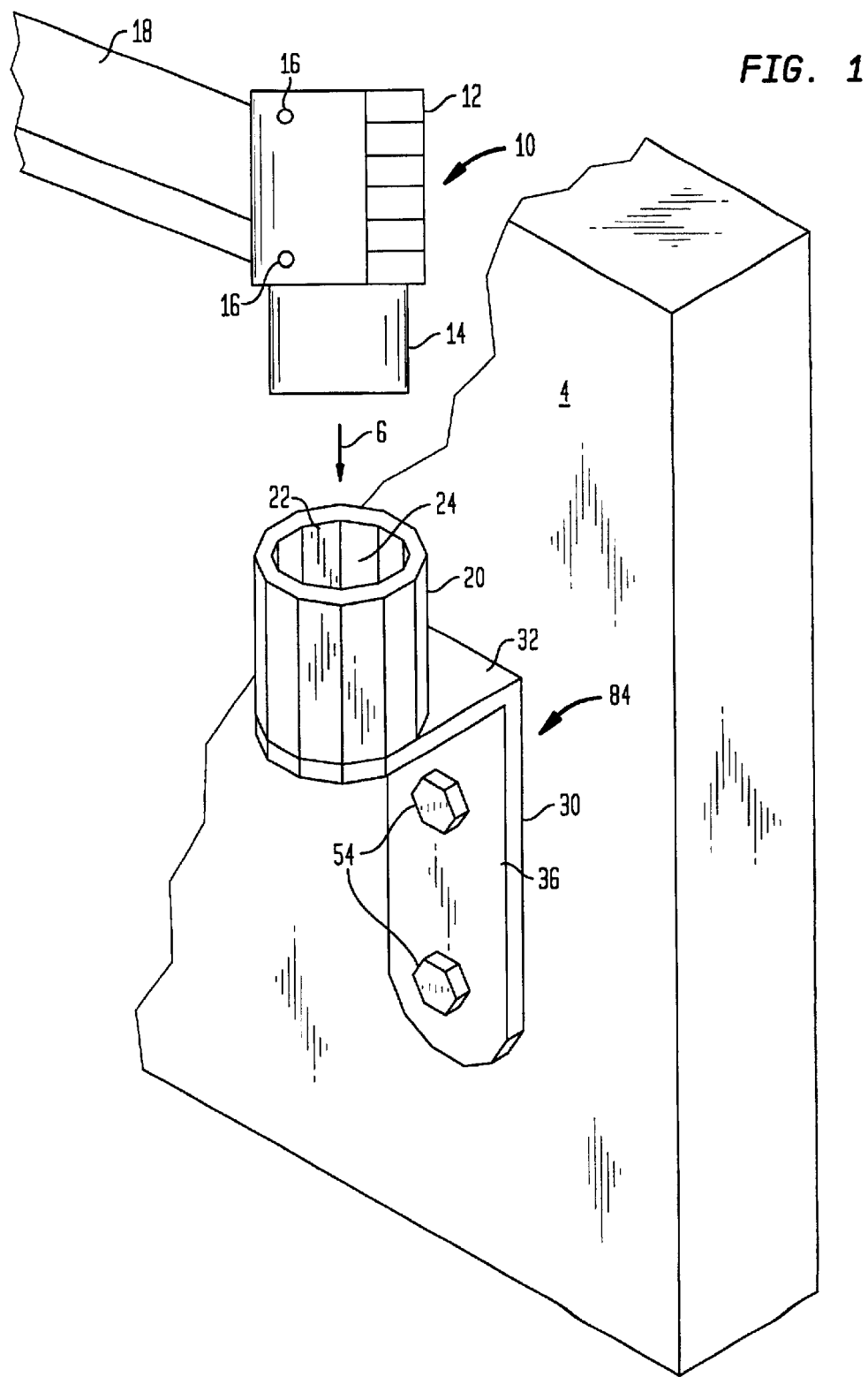
FIG. 1 is a perspective view of an apparatus according to the present invention in a reverse wall mount configuration and the orientation of the arm device to the mount.
Figure 2:
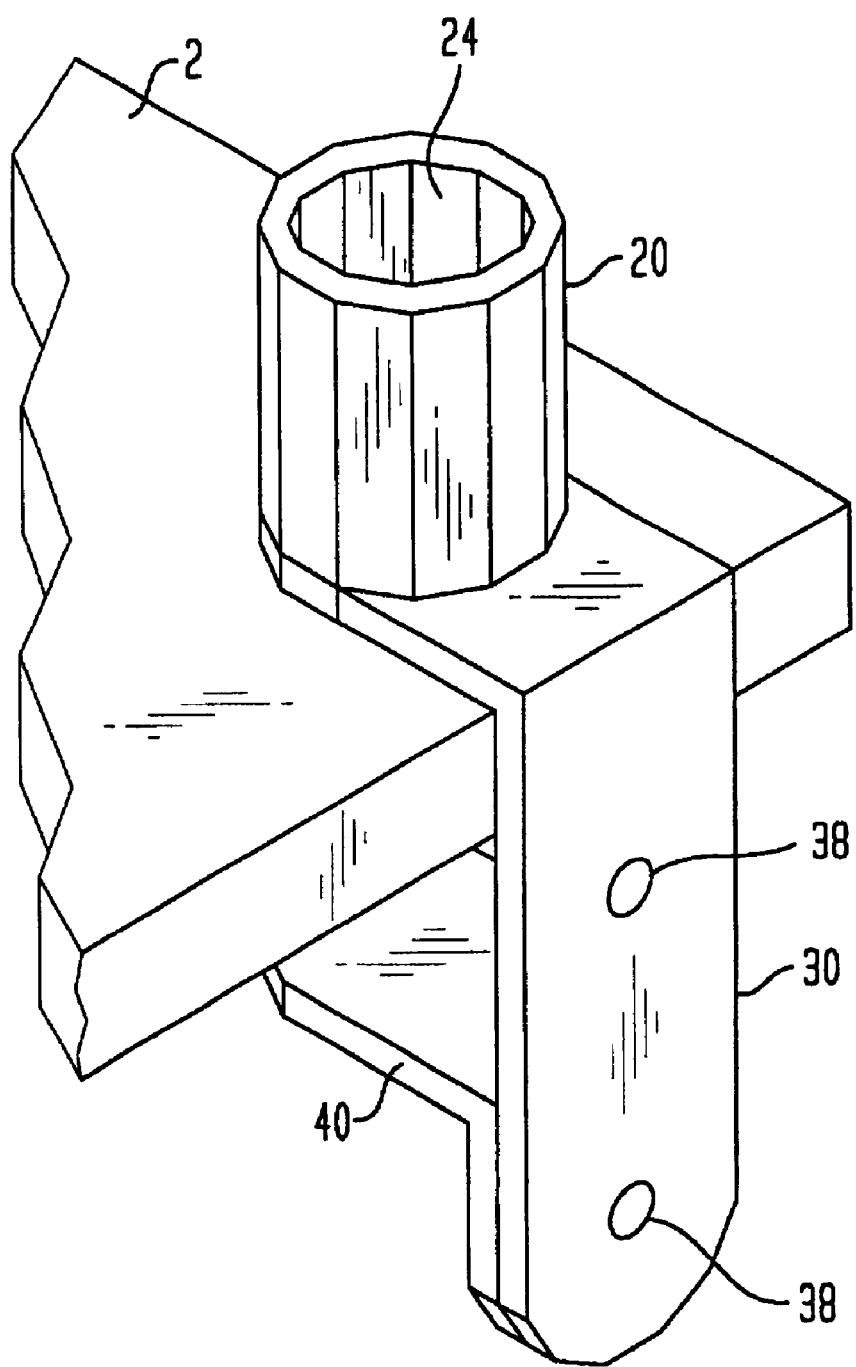
FIG. 2 is a perspective view of an apparatus according to the present invention in a clamp configuration mounted to a table top.
Figure 3:
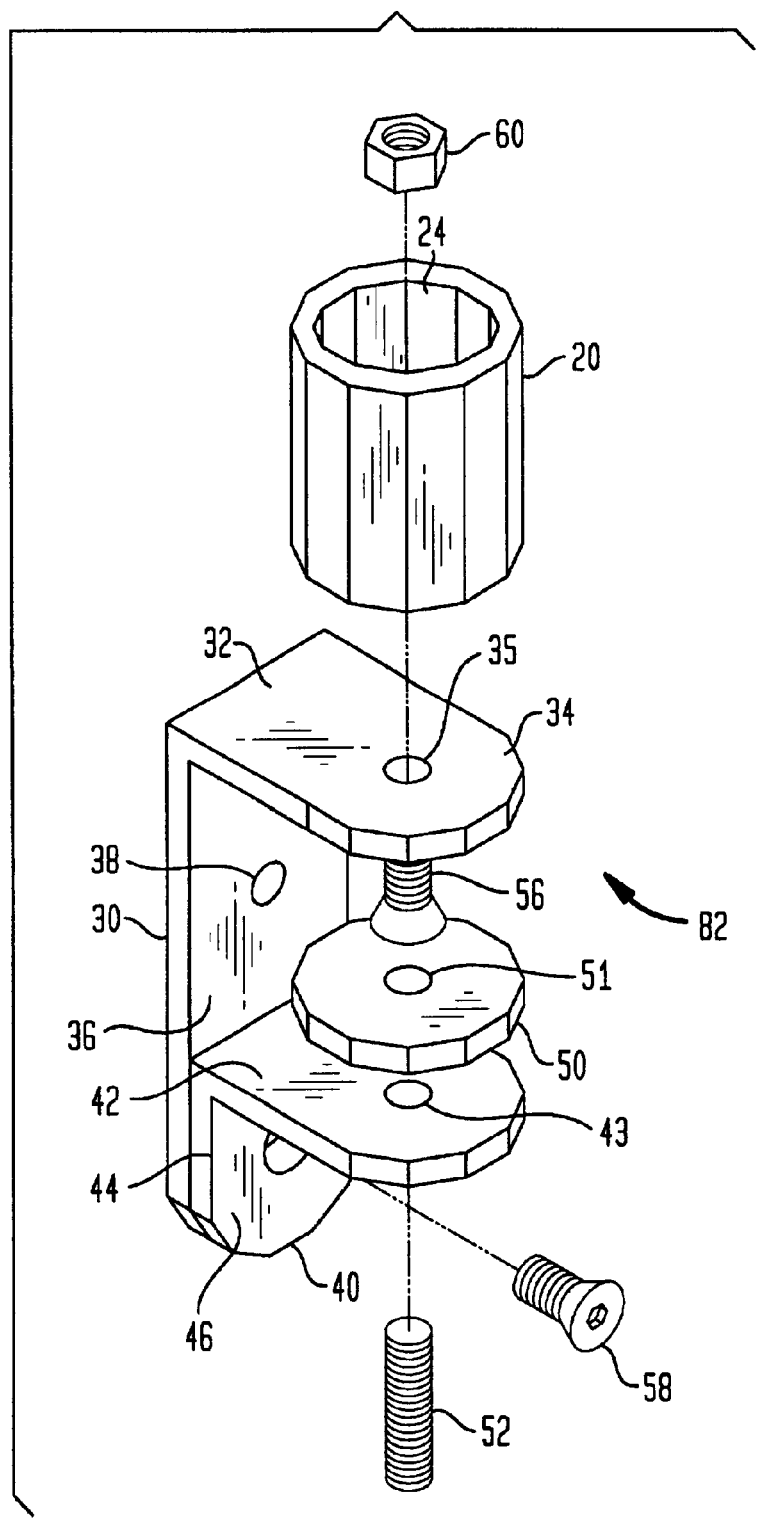
FIG. 3 is an exploded perspective view of a clamp configuration of the present invention.
Figure 4:
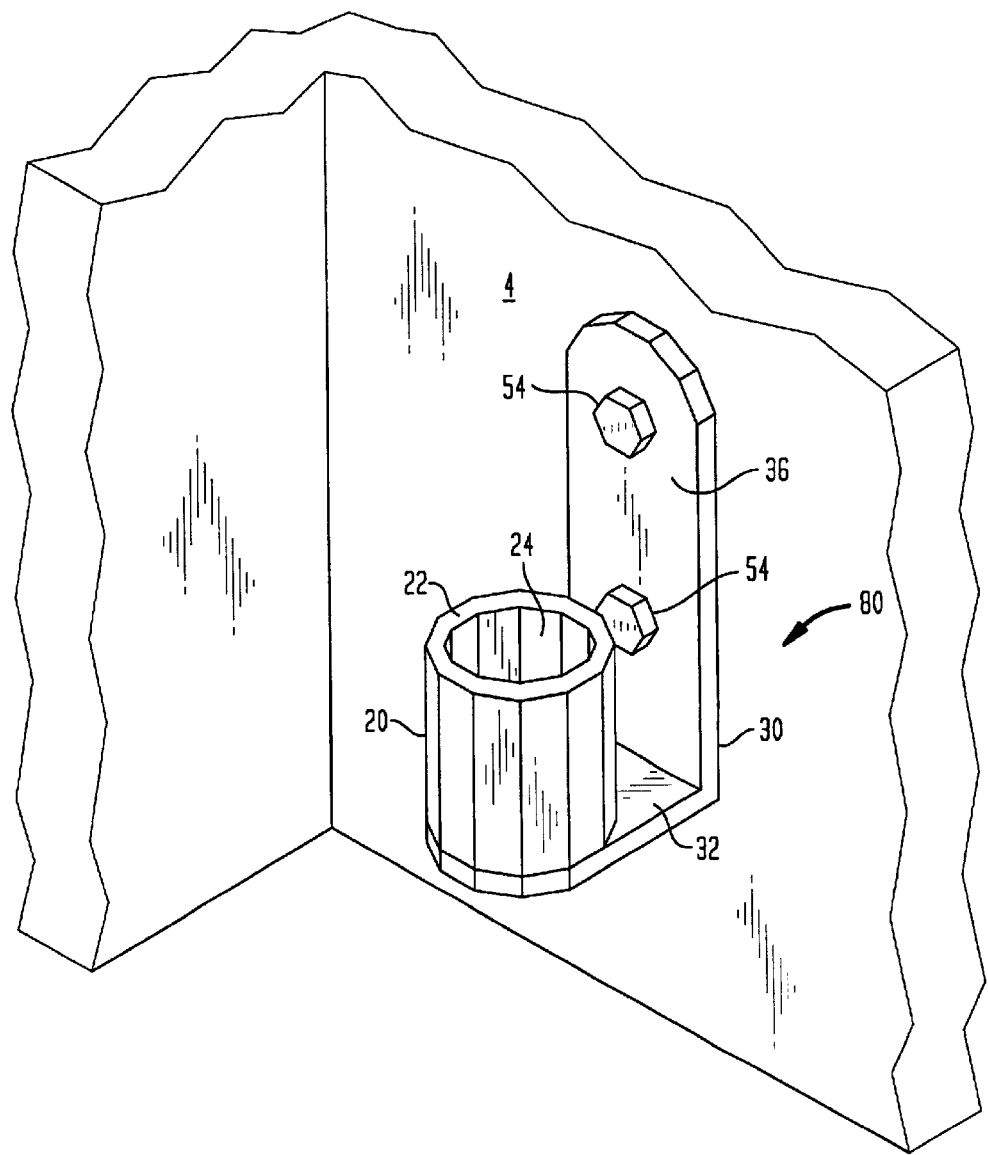
FIG. 4 is a perspective view of an apparatus according to the present invention in a wall mount configuration mounted to a wall.
Figure 5:
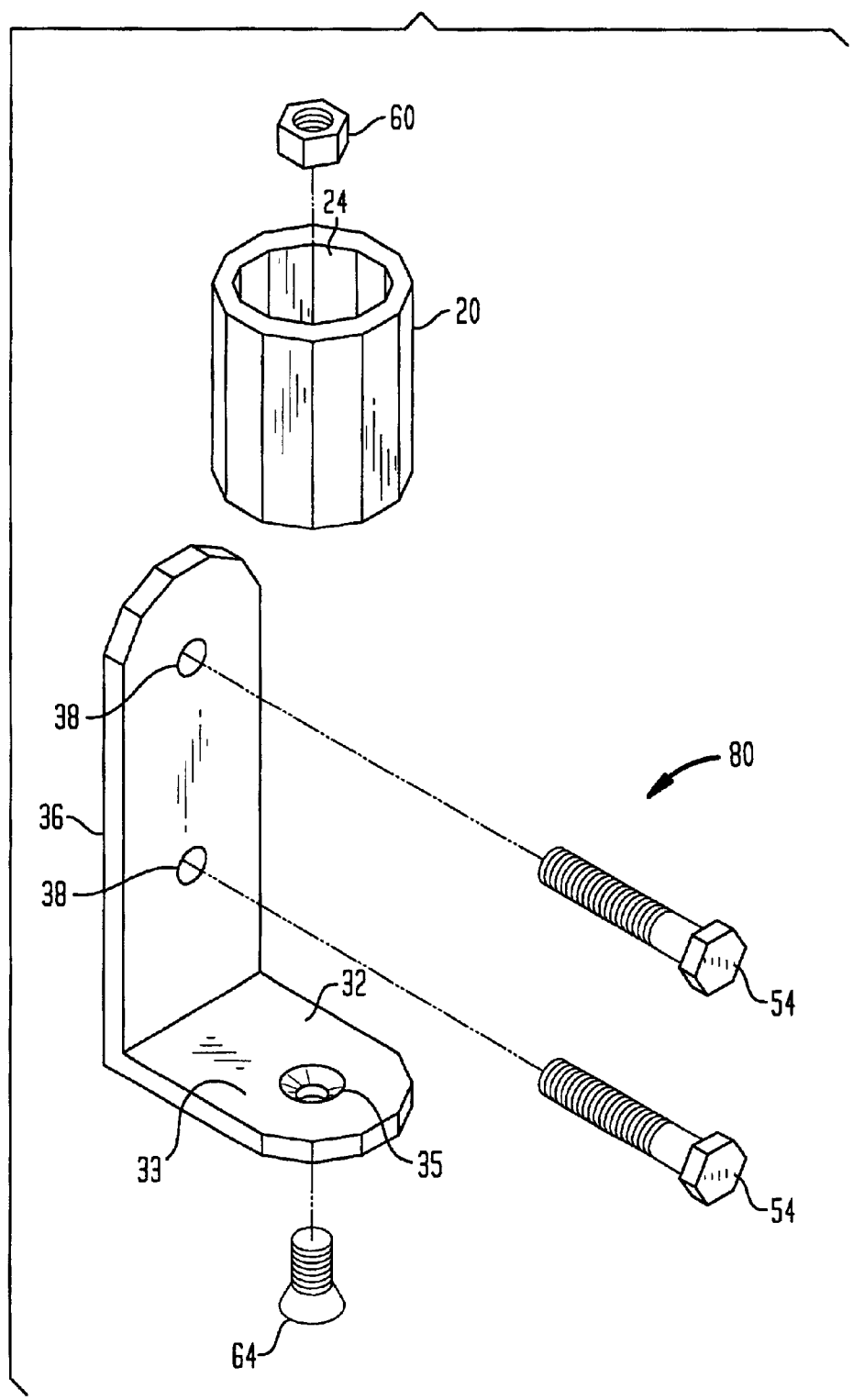
FIG. 5 is an exploded perspective view of a wall mount configuration of the present invention.
Figure 6:
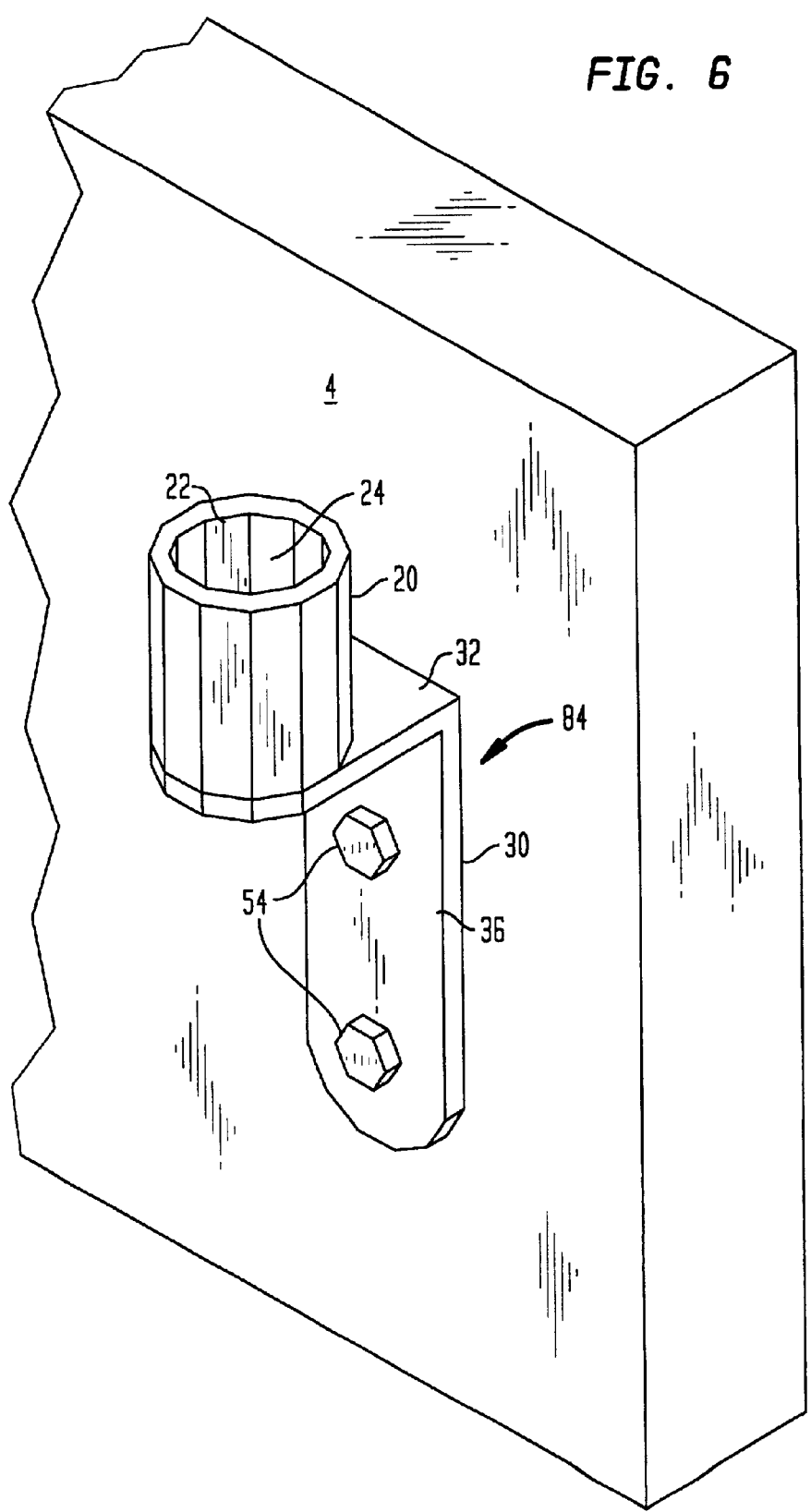
FIG. 6 is a perspective view of an apparatus according to the present invention in a reverse wall mount configuration mounted to a wall.
Figure 7:
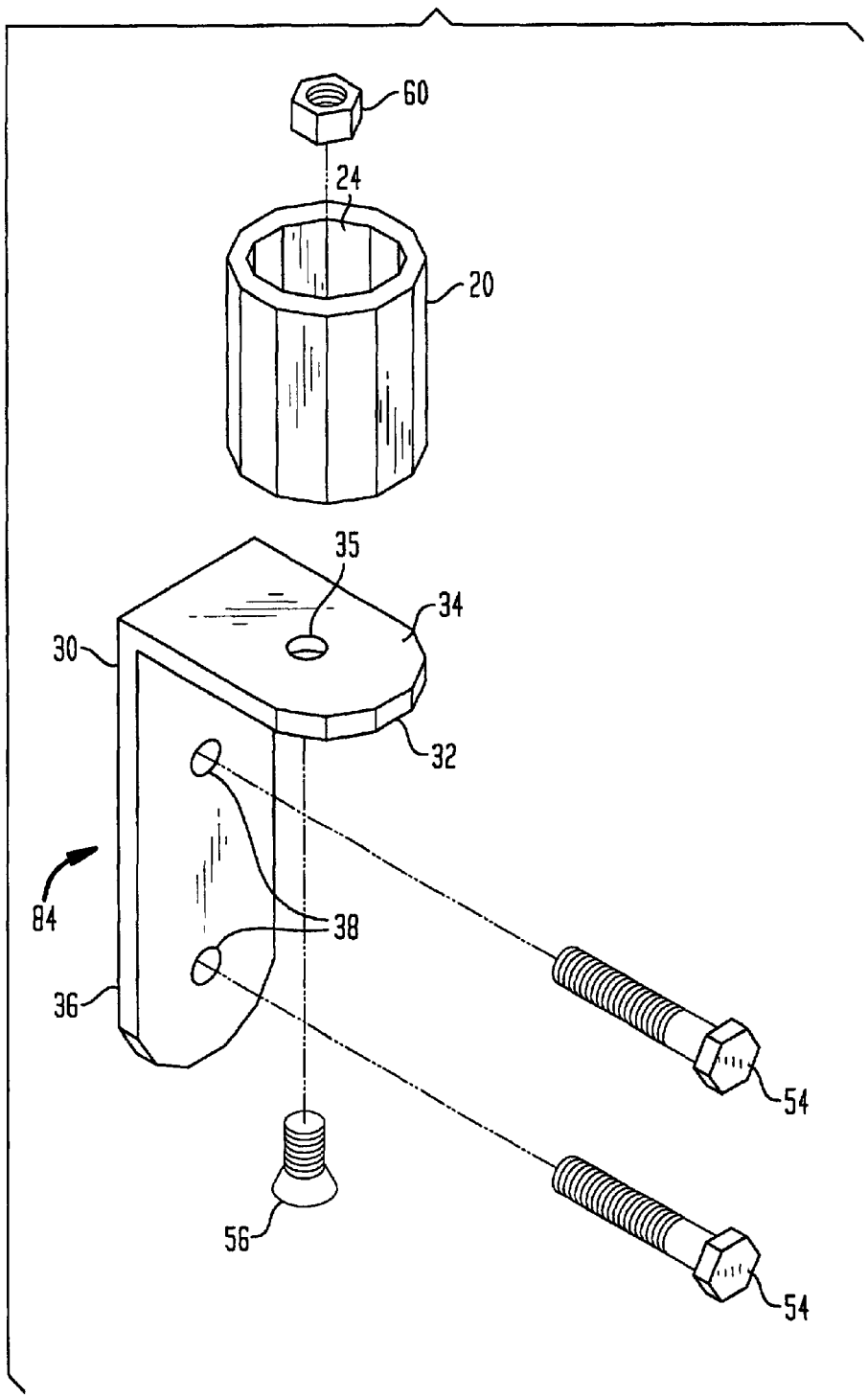
FIG. 7 is an exploded perspective view of a reverse wall mount configuration of the present invention.
Figure 8:
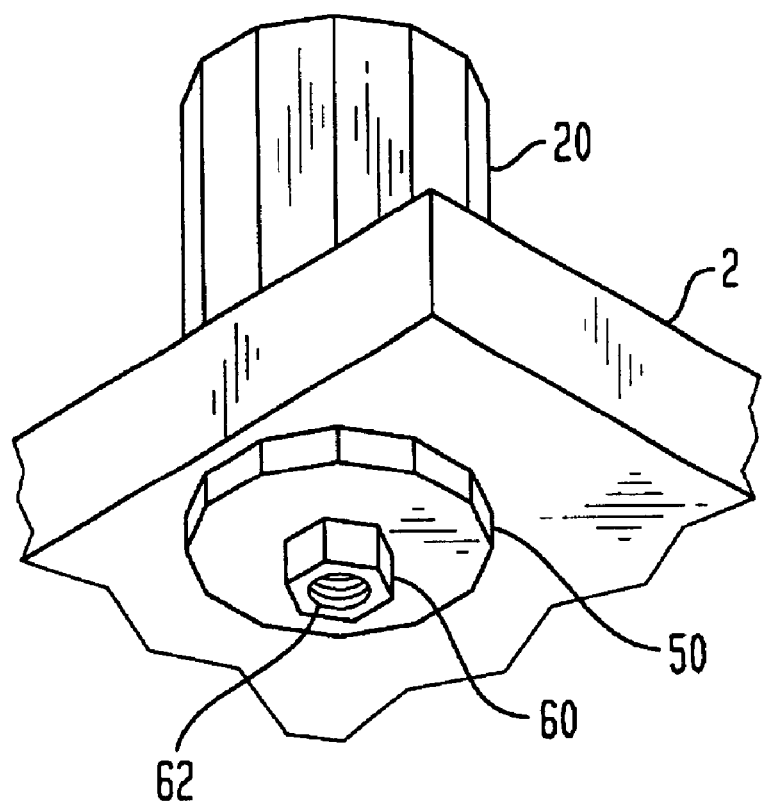
FIG. 8 is a perspective view of an apparatus according to the present invention in a table mount configuration mounted to a table top.
Figure 9:
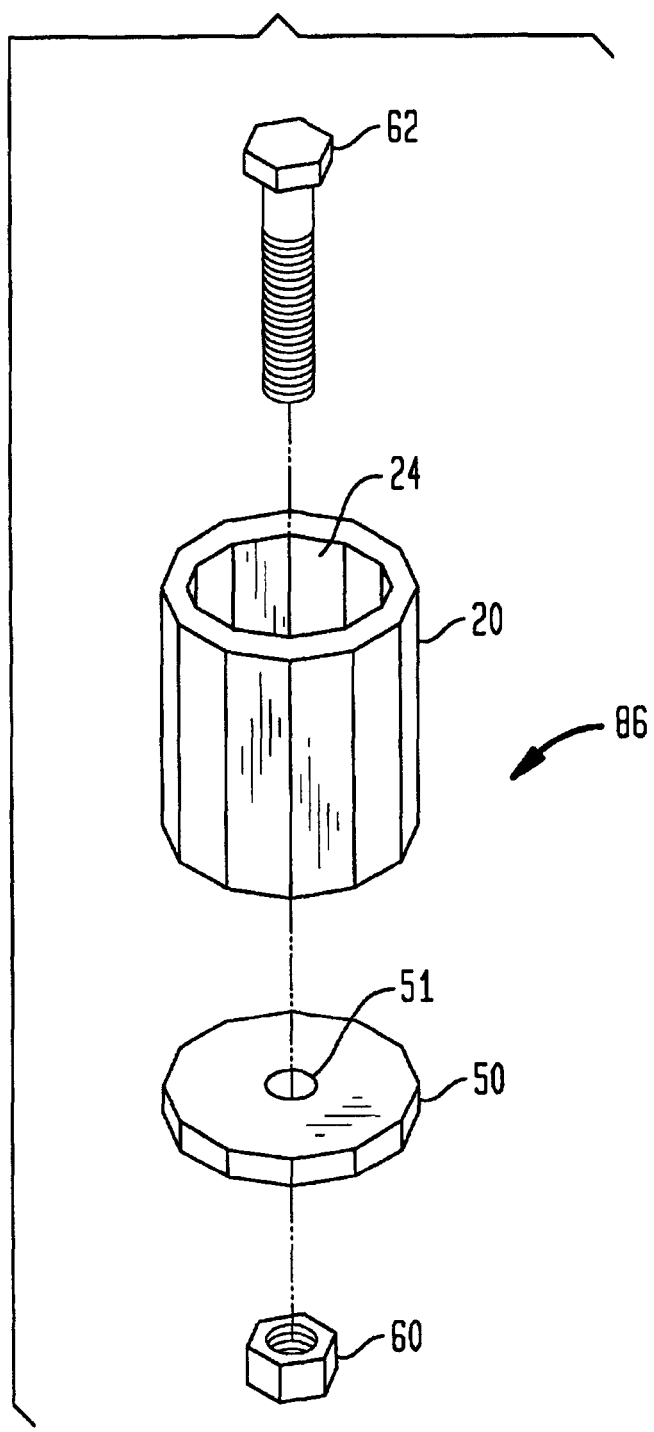
FIG. 9 is an exploded view of a table mount configuration of the present invention.
Figure 10A:
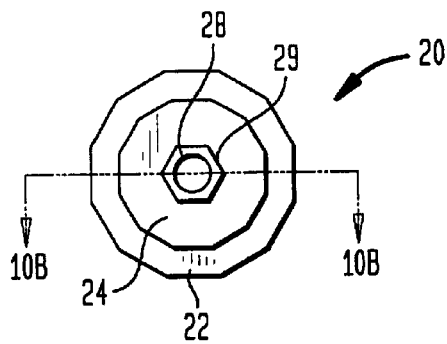
FIG. 10A is a top elevation view of a shaft holder according to the present invention.
Figure 10B:
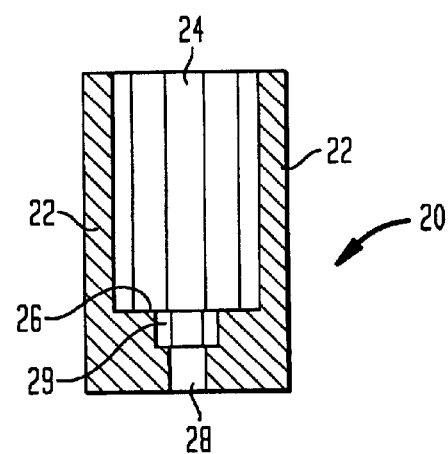
FIG. 10B is a cross-section side elevation view of the shaft holder shown in FIG. 10A along line 10B—10B.
Figure 11A:
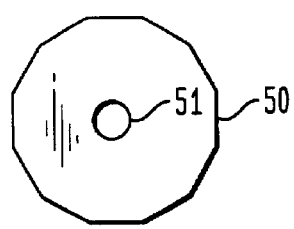
FIG. 11A is a top elevation view of a clamping plate according to the present invention.
Figure 11B:
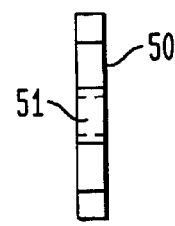
FIG. 11B is a side elevation view of the clamping plate shown in FIG. 11A.
Figure 12A:
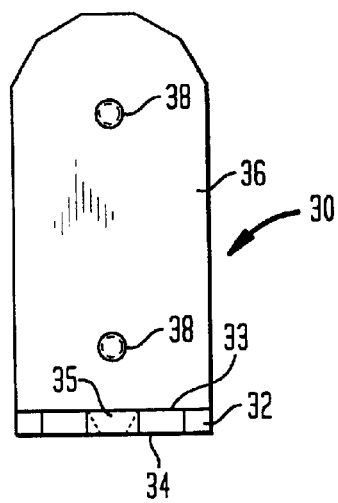
FIG. 12A is a front elevation view of a long "L" member according to the present invention.
Figure 12B:
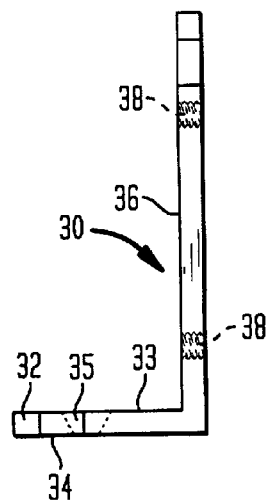
FIG. 12B is a side elevation of the long "L" member shown in FIG. 12A.
Figure 12C:
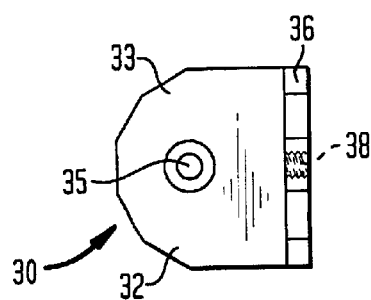
FIG. 12C is a top elevation view of the long "L" member shown in FIG. 12A.
Figure 13A:
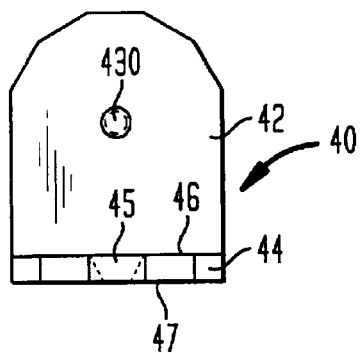
FIG. 13A is a front elevation view of a short "L" member according to the present invention.
Figure 13B:
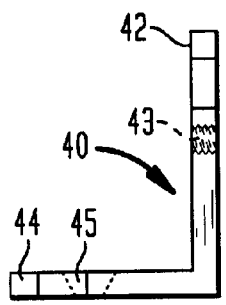
FIG. 13B is a side elevation of the short "L" member shown in FIG. 13A.
Figure 13C:
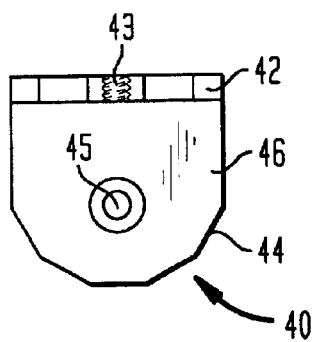
FIG. 13C is a top elevation view of the short "L" member shown in FIG. 13A.

In describing a preferred embodiment of the invention illustrated in the drawings, in which like numerals represent like parts, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 19 in particular, the apparatuses and systems of the present invention are disclosed.

Reference is made to FIGS. 1, 3, 5, 7, 9, 10A and 10B which illustrate mounting apparatuses 84, 82, 80, 86 for mounting a device 10 having an arm 18 on a surface 2, 4. Each apparatus includes a shaft holder 20 that has plurality of walls 22. It is anticipated that the plurality of walls 22 can merge to embody a shaft holder 20 that is circular. The walls 22 define a receptacle 24 having an enclosed bottom 26 and an opened top portion. The receptacle 24 is shaped to receive an arm device 10 having a cylindrical shaft 14. The shaft 14 of the arm device 10 may be removably inserted in receptacle 24 through the opened top portion as indicated by arrow 6, in which it may freely rotate.

In one embodiment (not shown), a washer may be placed in the bottom 26 of the receptacle 24 to create a more secure fit between the shaft 14 and the receptacle 24. Preferably, the washer is made of plastic. In yet another embodiment (not shown), a bushing can be included on the interior sides of the walls 22 of the receptacle 24 to create less friction and a more secure fit between the shaft 14 and the receptacle 24.

The mounting apparatuses of the current invention each include an attachment means to attach the shaft holder 20 to a surface. A wide variety of attachment means may be employed to attach the shaft holder 20 to a surface. The preferred attachment means, along with alternative attachment means, are subsequently described.

In preferred embodiments, the apparatuses further comprise a cylindrical threaded rod and a nut 60. The bottom 26 further comprises a hole 28 for receiving the rod. The shaft holder 20 is attached to a long "L" member 30 or to a surface 2,4 by passing the cylindrical threaded rod through the bottom 26 hole 28 and through the long "L" member 30 or the surface 2,4, and securing the nut 60 to the rod. When the shaft holder 20 is attached to a long "L" member 30, the long "L" member 30 in turn is attached to a surface 2,4.

FIGS. 1, 6, 7, 10A, 10B, and 12A through 12C show the mounting system of the present invention configured as a reverse wall mount apparatus 84 having a long "L" member 30. The long "L" member 30 has a first flange 32 and a second flange 36 that are generally perpendicularly attached to one another. First flange 32 has an "a" side 33 and a "b" side 34. The "a" side 33 is the side of first flange 32 that is facing second flange 36. The "b" side 34 is opposite the "a" side 33 of first flange 32.

Long "L" member 30 is secured by at least one wall screw 54 threaded through at least one threaded hole 38 in second flange 36, and into wall 4. Preferably, second flange 36 contains two threaded holes 38, arranged vertically to each other, and the long "L" member is secured by two wall screws 54. In a preferred embodiment, the wall screws 54 are made of wood, and they are secured to a stud in wall 4. Alternatively, any type of threaded cylindrical rod may be used in place of the at least one wall screw 54, provided the rod is of sufficient strength to hold the apparatus 84 to the wall 4.

In this embodiment, the shaft holder 20 is secured to the "b" side 34 of first flange 32 of long "L" member 30 by screw 56, having a flat tapered countersunk head, and nut 60. Preferably, screw 56 is ⅜-16×1 inch long. Screw 56 passes through hole 35 of first flange 32 and hole 28 of bottom 26 of shaft holder 20. The head of screw 56 may be received by a recess in the hole 35 on the "a" side of first flange 32. Preferably, bottom 26 has a recess 29 adapted to receive the nut 60.

With reference to FIGS. 2, 3, 10A through 13C, the mounting system configured as a clamp mount apparatus 82 is shown. Shaft holder 20 is secured to "b" side 34 of first flange 32 of long "L" member 30 by screw 56 and nut 60. In a preferred embodiment, screw 56 has a flat tapered countersunk head and dimensions of ⅜-16×1 inch long. Hole 35 on the "a" side 33 of first flange 32 has a recess to receive the tapered head of screw 56. The tapered head of screw 56 is adapted to be secured in a countersunk manner in hole 35 such that a flat surface is obtained on "a" side 33 of first flange 32. Screw 56 extends through hole 28 through the bottom 26 of shaft holder 20. A hex nut 60 is secured to screw 56.

Preferably, bottom 26 of shaft holder 20 has a recess 29 adapted to receive the nut 60 which facilitates in the securing of nut 60. Second flange 36 of long "L" member 30 has at least one threaded hole 38. In a preferred embodiment, second flange 36 has two threaded holes 38.

Short "L" member 40 having first flange 42 and second flange 44 in a general perpendicular orientation to each other is attached to the second hole 38 which is the farthest from first flange 32 of long "L" member 30 by screw 58. First flange 42 has a threaded hole 43, and second flange 44 has a recessed hole 45. Preferably, screw 58 has a flat tapered countersunk head and dimensions of ⅜-16×½ inch long. Screw 58 extends through hole 45 of flange 44 into the lower threaded hole in second flange 36 such that the head of screw 58 is countersunk relative to face 46.

It is to be understood however, that any type of threaded cylindrical rod may be used in place of screw 58, provided the rod is of sufficient strength to hold the short "L" member 40 to the long "L" member 30.

First flange 42 of short "L" member 40 has a threaded hole 43 for receiving clamping screw 52 which is screwed through hole 43 and meets hole 51 of clamping plate 50. Preferably, clamping screw 52 is ½-13×3 inches long, and the end of clamping screw 52 is adapted to receive a hex head wrench which is used to tighten the clamp.

Hole 43 is generally centered below hole 35 of first flange 32 of long "L" member 30. The mount is secured to a projecting work surface such as a table top by clamping the surface 2 between "a" side 33 of first flange 32 of long "L" member 30 and the top surface of clamping plate 50. In a preferred embodiment, the clamping plate 50 is made of steel, is circular, and has a 2 inch diameter. A hole 51 is located in the center of clamping plate 50.

In other embodiments (not shown), at least one buffering pad may be placed between "a" of first flange 32 and the surface 2. In addition, the at least one buffering pad may be alternatively or additionally placed between the top of clamping plate 50 and the surface 2. The buffering pad is shaped similarly to clamping plate 50, having a 2 inch diameter and including a center hole. The buffering pad can protect the surface from abrasion from the apparatus 82. In addition, the buffering pad can create a more secure contact between the apparatus 82 and the surface. While any non-abrasive material could be used to make the buffering pad, a preferred material is neoprene foam. Additionally, the buffering pad may contain an adhesive for adhering to the pad to the "a" side of first flange 32 or to the clamping plate 50.

Figure 18:
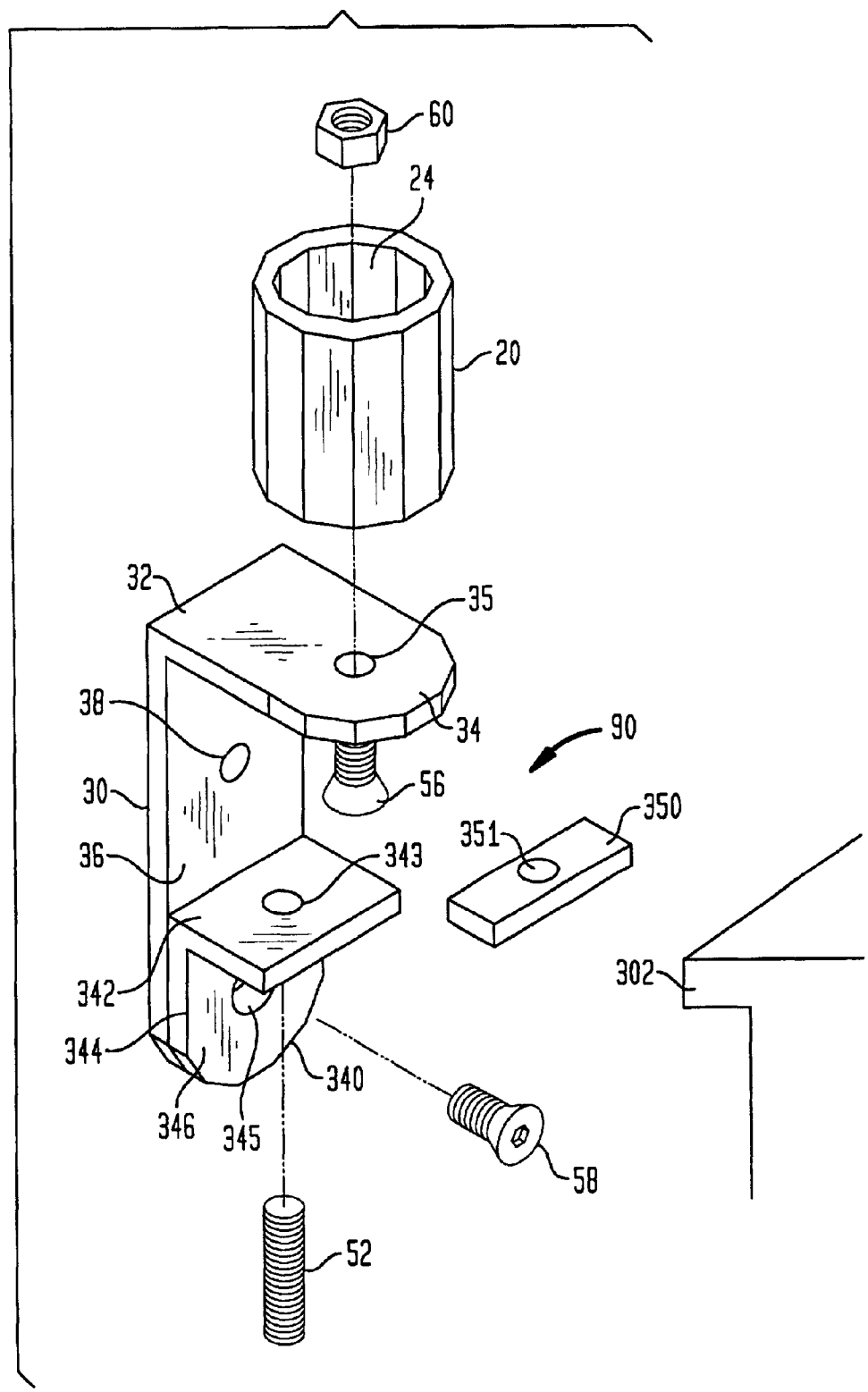
FIG. 18 is an exploded perspective view of a narrow clamp configuration of the present invention.
Figure 19:
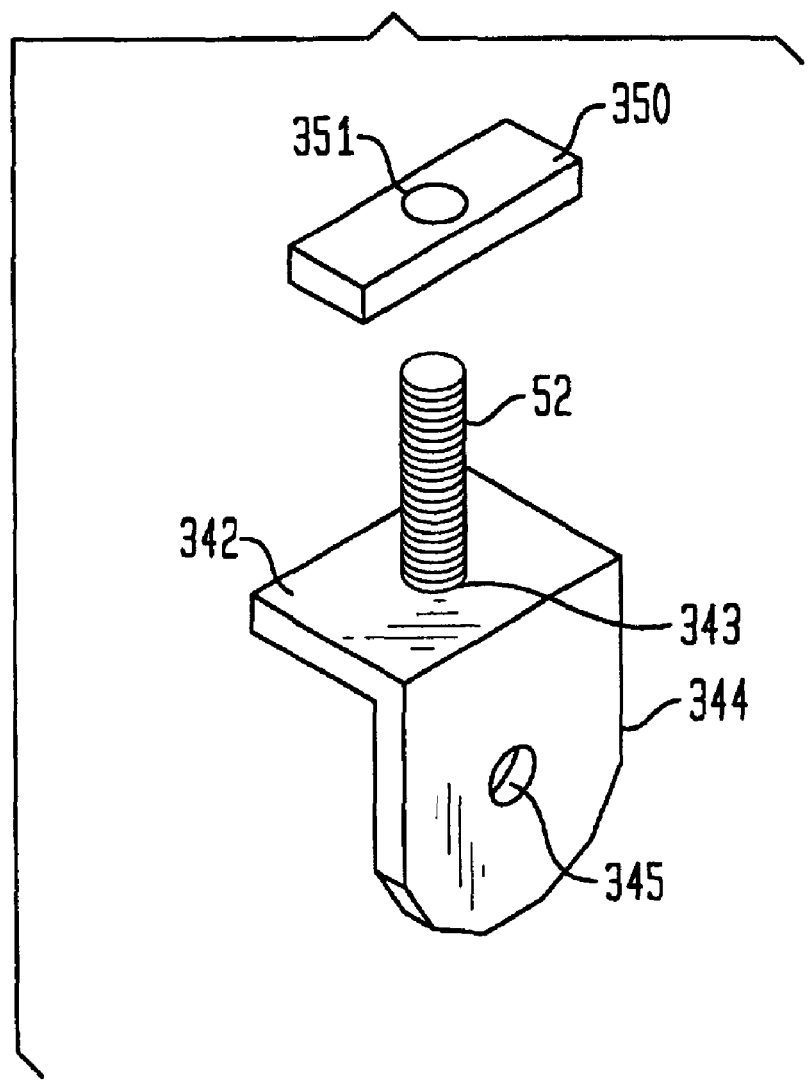
FIG. 19 is a side elevation view of the narrow short "L" member and the narrow clamping plate of the present invention.

FIGS. 18 and 19 show the mounting system of the present invention configured as a narrow clamp mount apparatus 90. The narrow clamp mount 90 is similar to the clamp mount 82. Narrow clamp mount 90 utilizes the long "L" member 30 and shaft holder 20 utilized in clamp mount 82. In addition, narrow clamp mount 90 attaches the long "L" member 30 to the shaft holder 20 in the same manner in which they are attached for the clamp mount 82.

The narrow clamp mount 90, however, is adapted to be clamped onto a narrow projecting surface 302, on which the top surface of the projection is deeper than the bottom surface of the projection. A desk having legs or sides is an example of a narrow projecting surface. The narrow clamp mount 90 can be used on a narrow projecting surface 302 that is narrower than the width of the first flange 42 of the short "L" member 40 of clamp mount 82. To fit on the narrow projecting surface 302, first flange 342 of narrow short "L" member 340 is narrower than first flange 42 of short "L" member 40. In addition, a clamping plate is used that is narrower than clamping plate 50. The narrow clamping plate 350 is at least as narrow as first flange 342 of narrow short "L" member 340. Preferably, the narrow clamping plate 350 is in the form of a rectangular clamping bar that has a centered hole 351.

In this embodiment, narrow short "L" member 340 having first flange 342 and second flange 344 in a general perpendicular orientation to each other is attached to the second hole 38 which is the farthest from first flange 32 of long "L" member 30 by screw 58. First flange 342 has a threaded hole 343, and second flange 344 has a recessed hole 345. Preferably, screw 58 has a flat tapered countersunk head and dimensions of ⅜-16×½ inch long. Screw 58 extends through hole 345 of flange 344 into the lower threaded hole in second flange 36 such that the head of screw 58 is countersunk relative to face 346.

It is to be understood however, that any type of threaded cylindrical rod may be used in place of screw 58, provided the rod is of sufficient strength to hold the narrow short "L" member 340 to the long "L" member 30.

First flange 342 of narrow short "L" member 340 has a threaded hole 343 for receiving clamping screw 52 which is screwed through hole 343 and meets hole 351 of narrow clamping plate 350. Preferably, clamping screw 52 is ½-13×3 inches long, and the end of clamping screw 52 is adapted to receive a hex head wrench which is used to tighten the clamp.

Hole 343 is positioned off-center below hole 35 of first flange 32 of long "L" member 30. The bottom side of the projecting portion of narrow projecting surface 302 may be narrower than the width of first flange 32 of long "L" member 30. First flange of narrow short "L" member 340 is narrower than first flange 32 of long "L" member 30. As a result, hole 343 is positioned closer than hole 35 to the edge of narrow projecting surface 302.

The mount 90 is secured to a narrow projecting work surface 302 by clamping the surface 302 between "a" side 33 of first flange 32 of long "L" member 30 and the top surface of narrow clamping plate 350. In a preferred embodiment, the narrow clamping plate 350 is made of steel. Buffering pads (not shown) may be utilized similarly to the utilization of the buffering pads for the clamp mount 82. However, in this embodiment, the buffering pad for the narrow clamping plate 350 would be rectangular.

FIGS. 4, 5, 10A, 10B, and 12A through 12C show the mounting system of the present invention configured as a wall mount apparatus 80. Similar to the reverse wall mount apparatus 84 configuration, long "L" member 30 is secured by at least one wall screw 54 threaded through at least one threaded hole 38 in second flange 36, and into wall 4. Preferably, second flange 36 contains two threaded holes 38, arranged vertically to each other, and the long "L" member is secured by two wall screws 54. In a preferred embodiment, the wall screws 54 are made of wood, and they are secured to a stud in wall 4. Alternatively, any type of threaded cylindrical rod may be used in place of the at least one wall screw 54, provided the rod is of sufficient strength to hold the apparatus 80 to the wall 4.

Shaft holder 20 is secured to "a" side 33 of first flange 32 by screw 64 and nut 60. Preferably, screw 64 has dimensions of ⅜-16×⅞ inches long. It is also preferred that nut 60 is positioned in recess 29 in the bottom of shaft holder 20. FIGS. 8, 9, 11A and 11B show the mounting system of the present invention configured as a table or flat mount 86. Table mount 86 comprises shaft holder 20 which is secured to a projecting surface 2, which may be a table top, preferably by passing bolt 62 through hole 28, a hole in surface 2 and hole 51 of clamping plate 50 and securing the same with nut 60. Preferably the bolt 62 has a tapered hex head, and dimensions of ⅜-16×2 inches long. In this preferred embodiment, the bottom hole 28 is recessed 29 for receiving the head of the bolt 62.

Preferably, the projecting surface 2 is at least one inch wide and no wider than the length of the bolt 62 with the nut 60 attached. A hole may be drilled in the surface 2 before passing the bolt 62 through the surface. Preferably, the drilled hole has a ⅜ inch diameter.

While the use of a clamping plate 50 is preferred, it may be omitted from the flat mount apparatus 86 configuration.

In other embodiments (not shown), at least one buffering pad may be placed between the bottom of the shaft holder 20 and the surface 2. In addition, the at least one buffering pad may be alternatively or additionally placed between the top of clamping plate 50 and the surface 2. Preferably, the buffering pad is shaped similarly to clamping plate 50, having a 2 inch diameter and including a center hole. The buffering pad can protect the surface from abrasion from the apparatus 86. In addition, the buffering pad can create a more secure contact between the apparatus 86 and the surface. While any non-abrasive material could be used to make the buffering pad, a preferred material is neoprene foam. Additionally, the buffering pad may contain an adhesive for adhering to the pad to the bottom of the shaft holder 20 or to the top of clamping plate 50.

Figure 14:
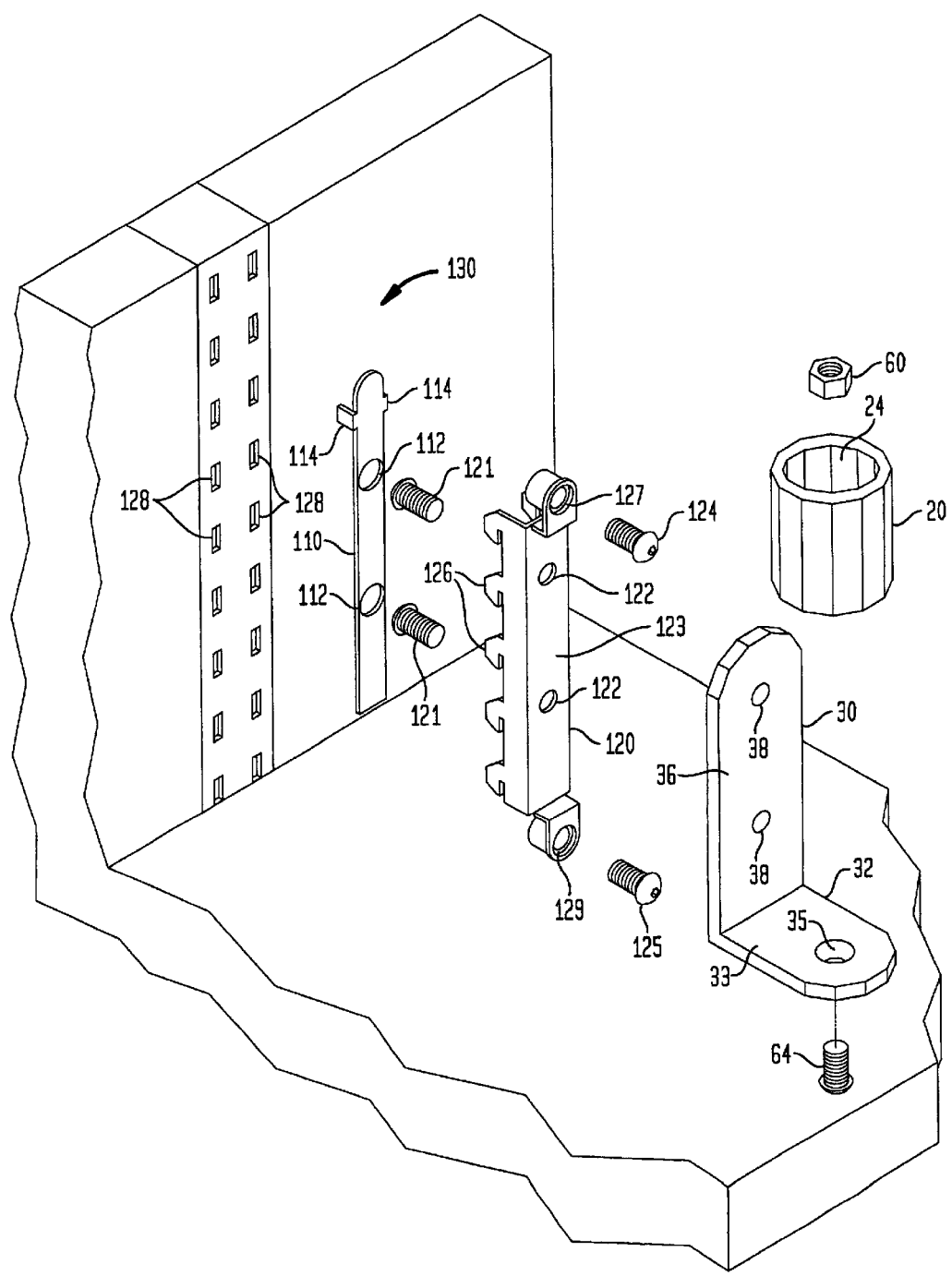
FIG. 14 is an exploded view of a mount configuration of the present invention with an adapter bracket to secure the mount to a office panel wall system.
Figure 15:
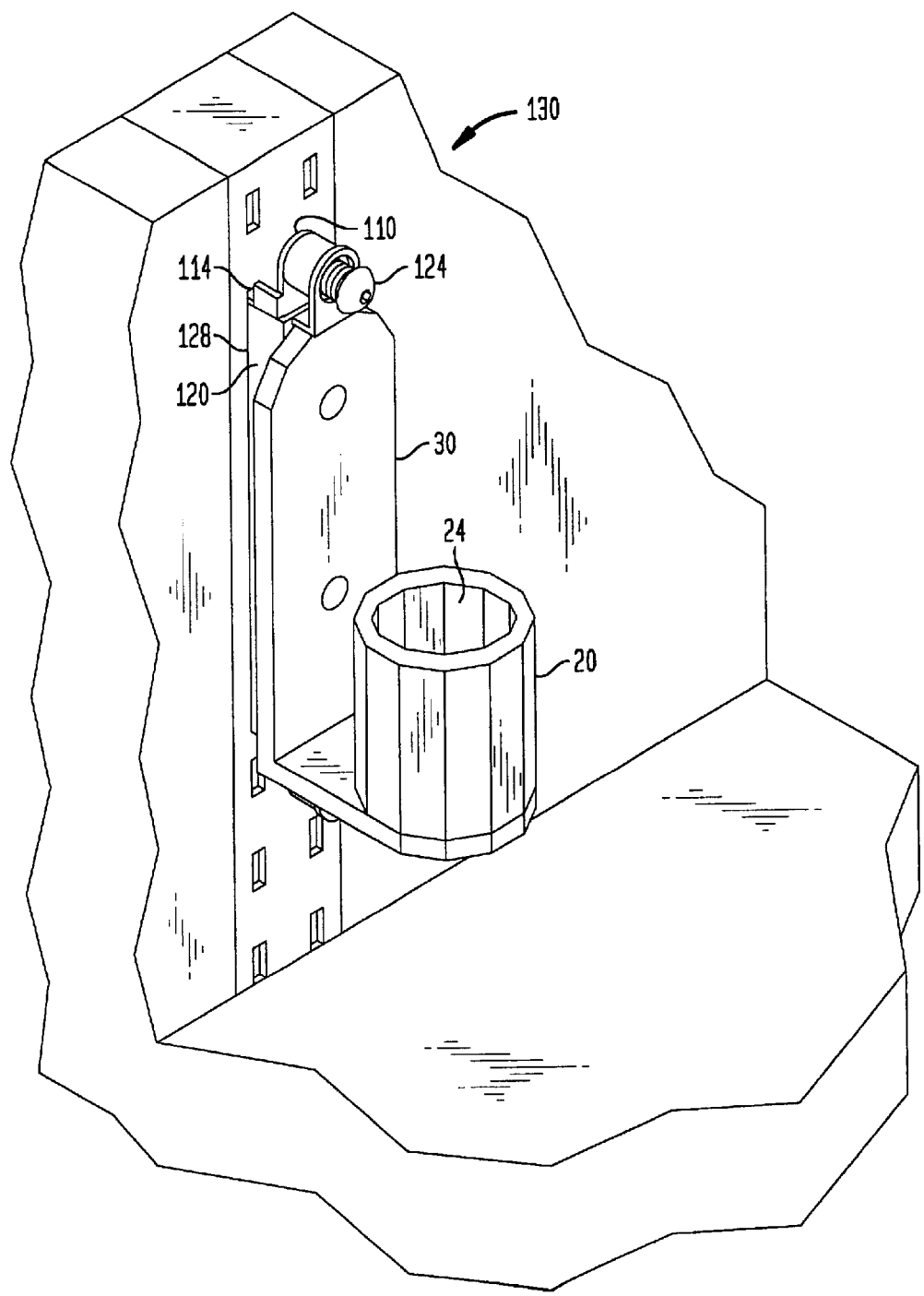
FIG. 15 is a perspective view of the panel wall mount configuration.

With reference to FIGS. 14 and 15, the mounting system of the present invention is configured as a panel wall mount apparatus. Typically, conventional panel wall systems have vertically aligned pairs of slots for receiving brackets and the like for securing shelves or table tops to the panel wall. The configurable mount of the present invention may be secured to the vertically aligned pairs of slots thereby permitting the arm apparatus to be secured directly to the panel wall 130. Second flange 36 of long "L" member 30 is attached to bracket 120 by at least one bolt 121 passing through at least one hole 122 on outward face 123 into at least one threaded hole 38 of second flange 36. Preferably, second flange 36 is attached to bracket 120 by two bolts 121 passing through two holes 122 on outward face 123 into two threaded holes 38 of second flange 36. Bracket 123 has a plurality of hooks 126 adapted to engage slots 128 in panel wall 130. Set screws or bolts 124 and 125 are threaded through holes 127 and 129 respectively and press against panel wall 130 to secure bracket 120 in a fixed manner. Preferably, threaded holes 127 and 129 for set screw or bolts 124 and 125 are positioned at the top and bottom of bracket 120. Preferably, plate 110 is positioned between panel wall 130 and set screws or bolts 124 and 125 to prevent damage to panel wall 130.

Optionally, plate 110 has tabs 114 for engaging a pair of slots 128 to assist in retaining plate 110 in the properly aligned position during assembly. Plate 110 may also have holes 112 to receive or permit at least one bolt 121 to pass through plate 110 in an unobstructed manner when bracket 120 is being secured to second flange 36 of long "L" member 30. Shaft holder 20 is secured to "a" side 33 of first flange 32 of long "L" member 30 as described above.

It is to be understood that any type of threaded cylindrical rod may be used in place of bolts 121 and set screws or bolts 124, 125 provided they are of sufficient strength for their intended purposes.

Figure 16:
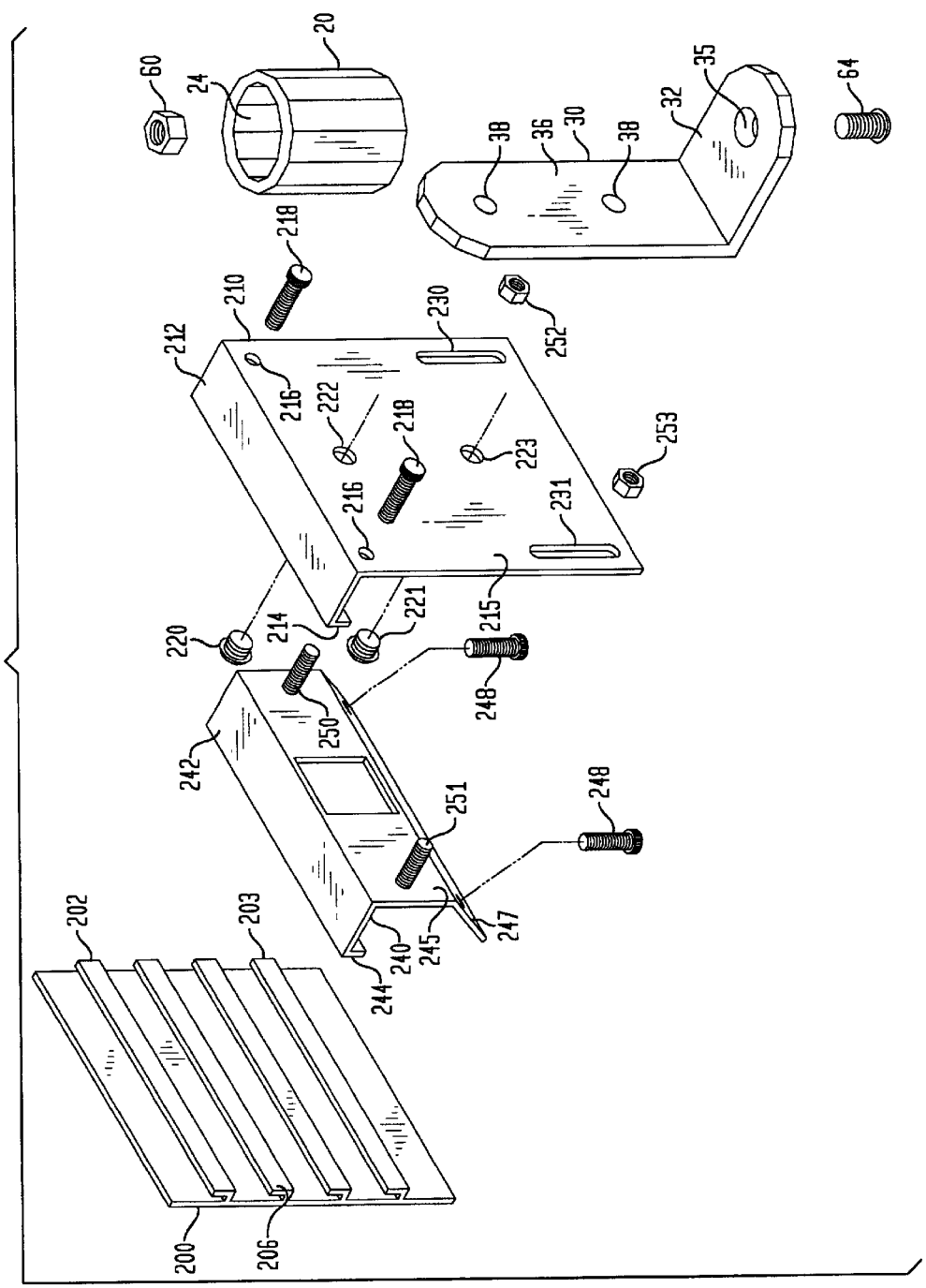
FIG. 16 is an exploded view of a mount configuration of the present invention with an adapter bracket arrangement to secure the mount to a slatwall having an upwardly facing slat.
Figure 17:
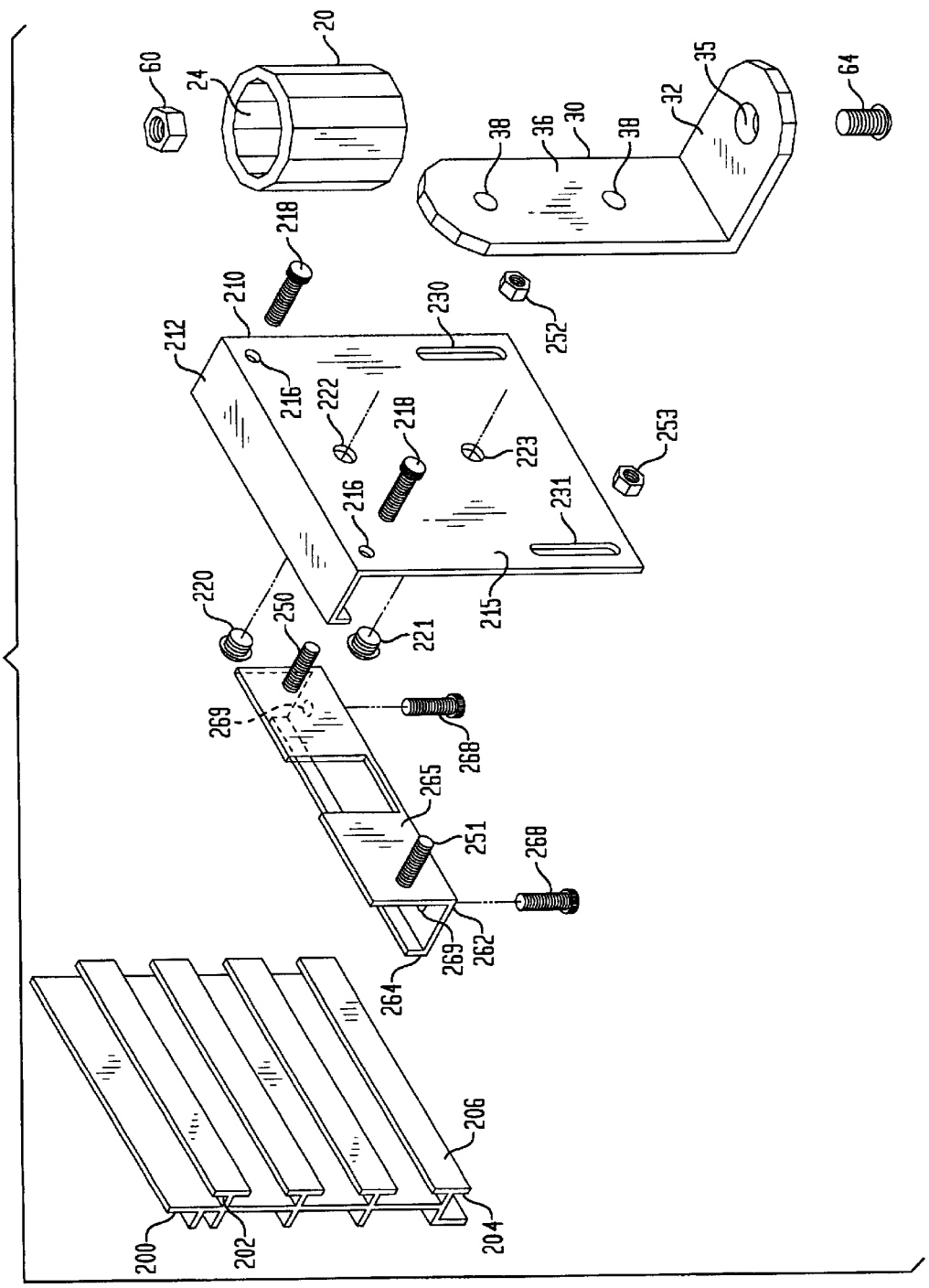
FIG. 17 is an exploded view of a mount configuration of the present invention with an adapter bracket arrangement to secure the mount to a slatwall having upwardly and downwardly facing slats.

FIGS. 16 and 17 show the mount of the present invention configured as a slat wall mount apparatus. FIG. 17 illustrates a configuration for mounting to a slatwall 200 having only upwardly facing slats. Second flange 36 of long "L" member 30 is attached to first bracket 210 by at least one bolt passing through at least one hole of face flange 215 into at least one threaded hole 38 of second flange 36. Preferably, second flange 36 is attached to first bracket 210 by bolts 220 and 221 passing through holes 222 and 223 respectively of face flange 215 into two threaded holes 38 of second flange 36. Lip 214 of top flange 212 is adapted to engage an upwardly facing slat 202 of slatwall 200. First bracket 210 is secured to the slat by set screws or bolts 218 threaded through holes 216 and tightened against face 206 of the slat.

A second bracket 240 has a top flange 242 with lip 244 to engage a lower upwardly facing slat 203. Second bracket 240 has a face flange 245 having a portion 247 thereof angled toward the slatwall 200 and is secured in position on lower slat 203 by set screws or bolts 248 which are threaded through portion 247 and press against the underside of lower slat 203. Second bracket 240 is secured to first bracket 210 by bolts 250 and 251 passing through holes in face flange 245 and slots 230 and 231, respectively, in face flange 215 and nuts 252 and 253. Shaft holder 20 is secured to "a" side 33 of first flange 32 of long "L" member 30 as described above.

It is to be understood that any type of threaded cylindrical rods may be used in place of bolts 220, 221, 250, 251 and set screws or bolts 218, 248 provided they are of sufficient strength for their intended purposes.

FIG. 17 illustrates a configuration of the mounting system of the present invention configured as an upwardly facing and downwardly facing slat wall mount apparatus. This apparatus is adapted for mounting to a slat wall 200 having upwardly and downwardly facing slats. First bracket 210 is secured to long "L" member 30 and the upwardly facing portion of slat 202 in the same manner as described above. In this configuration, a second bracket 260 has a lower flange 262 with lip 264 to engage the downwardly facing portion of slat 204. Second bracket 260 is secured in position on lower slat 204 by set screws or bolts 248 which are threaded through holes 269 through the bottom of lower flange 262 at an upward angle and press against the outer face 206 of lower slat 204. Second bracket 260 is secured to first bracket 210 by bolts 250 and 251 passing through holes in face flange 245 and slots 230 and 231, respectively, in face flange 215 and nuts 252 and 253. Shaft holder 20 is secured to "a" side 33 of first flange 32 of long "L" member 30 as described above.

It is to be understood that any type of threaded cylindrical rods may be used in place of bolts 250, 251 and set screws or bolts 248 provided they are of sufficient strength for their intended purpose.

This invention includes a mounting system that incorporates all or some of the components above described in FIGS. 1 through 19. In conjunction with the components described in FIGS. 1 through 19, the system of the current invention also includes all or some of the configurations above described in relation to FIGS. 1 through 19.

In addition to the preferred embodiments previously described in detail, the shaft holder 20 may be attached to a horizontal, vertical or angled surface my attachment means (not shown) including glue, magnets, hook and loop material sold under the trademark VELCRO, tongue and groove assemblies, and the like.

The components of the mounting system may be fabricated using any suitable material such as aluminum, iron, steel other alloys as are well known in the art. Preferably, long "L" member 30, short "L" member 40, shaft holder 20 and clamping plate 50 are cast forged. Any suitable, durable plastic material may be used for "lightweight" applications. In a preferred embodiment, the nut 60 is fabricated from nylon.

Although this invention has been illustrated by reference to specific embodiments, it will be apparent to those skilled in the art that various changes and modifications may be made which clearly fall within the scope of the invention.

What is claimed is:

1. A method of assembling a bracket from a plurality of components for mounting a device to one of a plurality of supporting surfaces each of a different configuration, said method comprising:

providing a plurality of components adapted to be assembled into a plurality of brackets each of a different configuration, at least one of said components comprising a shaft holder having an opening formed therein adapted to removably support said device, at least one of said brackets adapted to be assembled from less than all of said components, selecting one of said configurations of said plurality of brackets adapted for attachment to one of said plurality of supporting surfaces, selecting a plurality of said components for assembly into the selected bracket configuration, and assembling the selected plurality of said components including at least said shaft holder into the selected bracket configuration;

wherein a first one of said plurality of brackets comprises a clamp mount adapted for attaching said bracket to an edge portion of a supporting surface, wherein a second one of said plurality of brackets comprises a wall mount adapted for attaching said bracket to a vertical surface of a supporting surface, and wherein a third one of said plurality of brackets comprises a flat mount adapted for attaching said bracket to a horizontal surface of a supporting surface.

2. The method of claim 1, wherein said components comprise a threaded member, a first member having a first flange and a second flange generally perpendicularly attached to said first flange, and a second member having a third flange and a fourth flange generally perpendicularly attached to said third flange.

3. The method of claim 2, wherein said assembly step comprises attaching said shaft holder to said first member using said threaded member.

4. The method of claim 3, further including attaching said second member to said first member.

5. The method of claim 2, wherein said components further include a clamping plate having an opening, said assembly step comprising attaching said threaded member to said shaft holder with said threaded member extending through said opening in said clamping plate.

6. The method of claim 1, wherein said assembly step comprises attaching all of said components together in assembling said bracket.

7. The method of claim 1, wherein said assembly step comprises attaching less than all of said components together in assembling said bracket.

8. The method of claim 1, wherein said assembling step comprises attaching less than all of said components together in assembling said bracket.

9. A method of assembling a bracket from a plurality of components for mounting a device to a plurality of suporting surfaces, said method comprising:
   providing a kit containing a plurality of components adapted to be assembled into a plurality of brackets each of a different configuration, at least one of said components comprising a shaft holder having an opening formed therein adapted to removably support said device, at least one of said brackets adapted to be assembled from less than all of said components, and assembling a plurality of said components including at least said shaft holder into one of said brackets, wherein said bracket comprises a mount selected from the group consisting of a clamp mount, a wall mount and a flat mount for attachment to one of a plurality of supporting surfaces.

10. A method of assembling a bracket from a kit including a plurality of components, said bracket adapted for mounting a device to one of a plurality of supporting surfaces each of a different configuration, said method comprising:
   providing a kit containing a plurality of components adapted to be assembled into a plurality of brackets each of a different configuration, said components including a shaft holder having a opening formed threin adapted to removably support said device, a threaded member, a first member having a first flange and a second flange generally perpendicularly attachd to said first flange, and a second member having a third flange and a fourth flange generally perpendicularly attached to said third flange, at least one of said brackets adapted to be assembled from less than all of said components;
   selecting a plurality of components for assembly into a single bracket configuration adapted for attachment to one of said plurality of supporting surfaces, at least one of said components said shaft holder; and
   assembling the selected components including said shaft holder into said single bracket configuration, said assembly step including attaching said shaft holder to said first member using said threaded member;
   wherein a first one of said plurality of brackets comprises a clamp mount adapted for attaching said bracket to an edge portion of a supporting surface, wherein a second one of said plurality of brackets comprises a wall mount adapted for attaching said bracket to a vertical surface of a supporting surface, and wherein a third one of said plurality of brackets comprises a flat mount adapted for attaching said bracket to a horizontal surface of a supporting surface.

11. The method of claim 10, further including attaching said second member to said first member.

12. The method of claim 10, wherein said components further include a clamping plate having an opening, said assembly step comprising attaching said threaded member to said shaft holder with said threaded member extending through said opening in said clamping plate.

13. The method of claim 10, wherein said assembly step comprises attaching all of said components together in assembling said bracket.

14. The method of claim 10, wherein said assembly step comprises attaching less than all of said components together in assembling said bracket.

15. The method of claim 10, wherein said shaft holder is adapted to receive an extension arm for supporting an electronic device thereto.

16. The method of claim 9, wherein said shaft holder is adapted to receive an extension arm for supporting an electronic device thereto.

17. The method of claim 16, wherein said shaft holder is adapted to receive an extension arm for supporting an electronic device thereto.

18. A method of assembling a bracket from a plurality of components for mounting a device to one of a plurality of supporting surfaces each of a different configuration, said method comprising:
   providing a plurality of components adapted to be assembled into a plurality of brackets each of a different configuration, said method comprising:
   providing a plurality of components adapted to be assembled into a plurality of brackets each of a different configuration, at least one of said component comprising a shaft holder having an opening formed therein adapted to removably support said device, at least one of said brackets adapted to be assembled from less than all of said components, and assembling a plurality of said components including at least said shaft holder into one of said brackets adapted for attachment to one of said plurality of supporting surfaces, wherein said shaft holder is adapted to receive an extension arm for supporting an electronic device thereto;
   wherein a first one of said plurality of brackets comprises a clamp mount adapted for attaching said bracket to an edge portion of a supporting surface wherein a second one of said plurality of brackets comprises a wall mount adapted for attaching said bracket to a vertical surface of a supporting surface, and wherein a third one of said plurality of brackets comprises a flat mount adapted for attaching said bracket to a horizontal surface of a supporting surface.

19. A method of assembling a bracket from a plurality of components for mounting a device to one of a plurality of supporting surfaces each of a different configuration, said method comprising:
   providing a plurality of components adapted to be assembled into a plurality of brackets each of a different configuration, at least one of said components comprising a shaft holder having an opening formed therein adapted to removably support said device, at least one of said brackets adapted to be assembled from less than all of said components, and assembling a plurality of said components including at least said shaft holder into one of said brackets adapted for attachment to one of said plurality of supporting surfaces, wherein said components comprises a first member having a first flange and a second flange generally perpendicularly attached to said first flange, and a second member having a third flange and a fourth flange generally perpendicularly attached to a third flange;

wherein a first one of said plurality of brackets comprises a clamp mount adapted for attaching said bracket to an edge portion of a supporting surface, wherein a second one of said plurality of brackets comprises a wall mount adapted for attaching said bracket to a vertical surface of a supporting surface, and wherein a third one of said plurality of brackets comprises a flat mount adapted for attaching said bracket to a horizontal surface of a supporting surface.

20. The method of claim 19, wherein said assembly stp comprises attching sais shaft holder to said first member using a threaded member.

21. The method of claim 20, further including attaching said second member to said first member.

22. The method of claim 19, wherein said components further include a clamping plate having an opening, said assembly step comprising attaching said threaded member to said shaft holder with said threaded member extending through said opening in said clamping plate.

23. A method of assembling a bracket from a plurality of components for mounting a computer display screen to a plurality of supporting surfaces, said method comprising:

providing a plurality of components adapted to be assembled into a plurlaity of brackets each of a different configuration for attachment to one of a plurality of supports, at least one of said components comprising a holder adapted to removably couple said computer display screen thereto, at least one of said brackets adapted to be assembled from less than all of said components, and assembling a plurality of said components including at least said holder into one of said brackets, wherein a first one of said plurality of brackets comprises a clamp amount adapted for attaching said bracket to an edge portion of supporting surfaces, wherein a second one of said plurality of brackets comprises a wall mount adapted for attaching said bracket to a vertical surface of a supporting surface, and wherein a third one of said plurality of brackets comprises a flat amount adapted for attaching said bracket to horizontal surface of a supporting surface.

24. A method of assembling a bracket from a kit including a plurality of componentsd, said bracket adapted for mounting a computer display screen to a plurality of supporting surface, said method comprising:

providing a kit containing a plurality of components adapted to be assembled into a plurality of brackets each of a different configuration for attachment ton one of a plurality of supporting surfaces, said components including a holder adapted to removably couple said computer display screen thereto, a first member having a first flange and a second flange generally perpendicularly attached to said first flange, and a second member having a third flange and a fourth flange generally perpendicularly attached to said third flange, at least one of said brackets adapted to be assembled from less than all of said components;

selecting a plurality of components for assembly into a single bracket configuration, at least one of said components comprising said holder, wherein said single bracket configuration comprises a mount selected from the group consisting of a clamp mount adapted for attaching said bracket to an edge portion of a supporting surface and a wall mount adapted for attaching said bracket to a vertical surface of supporting surface; and assembling the selected components into said single bracket configuration by at least attaching said holder to said first member.

25. A method of assembling a bracket from a plurality of components for mounting a computer display screen to one of plurality of supporting surfaces each of a different configuratioin, said method comprising:

providing a plurality of components adapted to be assembled into a plurality of brackets each of a different configuration, one of said bracket adapted to be attached to a horizontal supporting surface and another one of said brackets adapted to be attached to a vertical supporting surface, at least one of said components comprising a holder adapted to removably couple said computer display screen thereto, at least one of said brackets adapted to be assembled from less than all of said component, and assembling a plurality of said components including at least said holder into one of said brackets adapted for attachment to one of said plurality of supporting surfaces;

wherein a first one of said plurality of brackets comprises a clamp mount adapted for attaching said bracket to an edge portion of a supporting surface, wherein a second one of said plurality of brackets comprises a wall mount adapted for attaching said bracket to a vertical surface of a supporting surface, and wherein a third one of said plurality of brackets comprises a flat mount adapted for attaching said bracket to a horizontal surface of a supporting surface.

26. A method for assembling a bracket from a plurality of components for mounting a computer display screen to a plurality of supporting surfaces, said method comprising providing a plurality of components adapted to be assembled into a plurality of brackets each of a different configuration for attachment to one of a plurality of supporting surfaces, at least one of said components comprising a holder adapted to removably couple the computer display screen thereto, at least one of said brackets adapted to be assembled from less than all of said components; selecting a plurality of said components for assembly into the selected bracket configuration; and assembling the selected plurality of said components including at least said holder into the selected bracket configuration, provided that, at least one of said plurality of brackets includes a clamp mount which comprises a first one of said plurality of brackets adapted for attaching said bracket to an edge portion of the supporting surface, and optionally a wall mount which comprises a second one of said plurality of brackets adapted for attaching said bracket to a vertical surface of supporting surface, and optionally a flat mount which comprises third one of said plurality of brackets adapted for attaching said bracket to the horizontal surface of supporting surface.

27. A method for assembling a bracket from a plurality of components provided as a kit, said bracket adapted for mounting a device to a plurality of supporting surfaces, said method comprising providing a plurality of components adapted to be assembled into a plurality of brackets each of a different configuration for attachment to one of a plurality of supporting surfaces, said components including a holder adapted to removably couple said device thereto, a first member having a first flange and a second flange generally perpendicularly attached to said first flange, said first flange having an inner surface and an outer surface, said holder capable of being attached to at least one of said inner surface and said outer surface of said first flange when assembling said plurality of components into a plurality of brackets each of a different configuration, and a second member having a third flange and a fourth flange generally perpendicularly attached to said third flange, said second member capable of being attached to said first member when assembling said plurality of components into one of said plurality of brackets, at least one of said brackets adapted to be assembled from less than all said components; selecting a plurality of said components for assembly into the selected bracket configuration; and assembling the selected plurality of said components including at least said holder into the selected bracket configuration, provided that, at least one of said plurality of brackets includes a clamp mount which comprises a first one of said plurality of brackets adapted for attaching said bracket to an edge portion of the supporting surface, and optionally a wall mount which comprises a second one of said plurality of brackets adapted for attaching said bracket to a vertical surface of th supporting surface, and optionally a flat mount which comprises a third one of said plurality of brackets adapted for attaching said bracket to a horizontal surface of the supporting surface.

* * * * *

UNITED STATES PATENT AND TRADEMARK OFFICE
CERTIFICATE OF CORRECTION

PATENT NO. : 7,096,560 B2
APPLICATION NO. : 09/916934
DATED : August 29, 2006
INVENTOR(S) : Odd N. Oddsen, Jr.

It is certified that error appears in the above-identified patent and that said Letters Patent is hereby corrected as shown below:

Column 2, Line 6 insert --,-- after the word "description".

Column 2, Line 56 "a" should be replaced by --an--.

Column 3, Line 23 insert --a-- after the word "has".

Column 8, Line 24 "my" should read --by--.

Column 8, Line 29 insert --or-- after the word "steel".

Claim 1, Column 8, Line 64 "surfaceof" should read --surface of--.

Claim 10, Column 9, Line 53 "attachd" should read --attached--.

Claim 10, Column 9, Line 61 insert --comprising-- after the word "components".

Claim 16, Column 10, Lines 23 through 26 "16. The method of claim 9, wherein said shaft holder is adapted to receive an extension arm for supporting an electronic device thereto." should read --16. A method of assembling a bracket from a kit including a plurality of components, said bracket adapted for mounting a device to a plurality of supporting surfaces, said method comprising: providing a kit containing a plurality of components adapted to be assembled into a plurality of brackets each of a different configuration, said components including a shaft holder having an opening formed therein adapted to removably support said device, a threaded member, a first member having a first flange and a second flange generally perpendicularly attached to said first flange, and a second member having a third flange and a fourth flange generally perpendicularly attached to said third flange, at least one of said brackets adapted to be assembled from less than all of said components; selecting a plurality of components for assembly into a single bracket configuration, at least one of said components comprising said shaft holder, wherein said single bracket configuration comprises a mount selected from the group consisting of a clamp mount, a wall mount and a flat mount for attachment to one of a plurality of supporting surfaces; and assembling the selected components into said single bracket configuration by at least attaching said shaft holder to said first member using said threaded member.--

Claim 18, Column 10, Lines 34 through 36 "providing a plurality of components adapted to be assembled into a plurality of brackets each of a different configuration, said method comprising:" should be deleted.

UNITED STATES PATENT AND TRADEMARK OFFICE
CERTIFICATE OF CORRECTION

| | |
|---|---|
| PATENT NO. | : 7,096,560 B2 |
| APPLICATION NO. | : 09/916934 |
| DATED | : August 29, 2006 |
| INVENTOR(S) | : Odd N. Oddsen, Jr. |

It is certified that error appears in the above-identified patent and that said Letters Patent is hereby corrected as shown below:

Claim 18, Column 10, Line 39 "component" should read --components--.

Claim 18, Column 10, Line 51 insert a --,-- after the word "surface".

Claim 19, Column 11, Line 5, "comprises" should read --comprise--.

Claim 20, Column 11, Line 20 "attching sais" should read --attaching said--.

Claim 23, Column 11, Line 43 insert --a-- after the word "of". "Surfaces" should read --surface--.

Claim 23, Column 11, Line 40 insert --a-- after the word "to".

Claim 24, Column 11, Line 51 "componentsd" should read --components--.

Claim 24, Column 11, Line 53 "surface" should read --surfaces--.

Claim 24, Column 11, Line 56 "ton" should read --to--.

Claim 24, Column 12, Line 6 insert --the-- before the word "supporting".

Claim 25, Column 12, Line 12 insert --a-- before the word "plurality".

Claim 25, Column 12, Line 16 "bracket" should read --brackets--.

Claim 25, Column 12, Line 23 "component" should read --components--.

Claim 26, Column 12, Line 55 insert --the-- before the word "supporting".

Claim 26, Column 12, Line 56 insert --a-- before the word "supporting".

UNITED STATES PATENT AND TRADEMARK OFFICE
CERTIFICATE OF CORRECTION

PATENT NO. : 7,096,560 B2
APPLICATION NO. : 09/916934
DATED : August 29, 2006
INVENTOR(S) : Odd N. Oddsen, Jr.

It is certified that error appears in the above-identified patent and that said Letters Patent is hereby corrected as shown below:

Claim 27, Column 14, Line 9 "th" should read --the--.

Signed and Sealed this

Twenty-fifth Day of September, 2007

JON W. DUDAS
*Director of the United States Patent and Trademark Office*